(12) United States Patent
Sabadell et al.

(10) Patent No.: US 6,847,384 B1
(45) Date of Patent: Jan. 25, 2005

(54) TRANSLATING OBJECTS BETWEEN SOFTWARE APPLICATIONS WHICH EMPLOY DIFFERENT DATA FORMATS

(75) Inventors: Stewart Sabadell, Novato, CA (US); John Hutchinson, San Rafael, CA (US); Nikolai Sander, Mill Valley, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/286,133

(22) Filed: Apr. 1, 1999

Related U.S. Application Data

(60) Provisional application No. 60/085,436, filed on May 14, 1998.

(51) Int. Cl.[7] .............................. G06G 7/48; G06F 7/60; G06F 7/00; G06F 17/00; G09G 5/00
(52) U.S. Cl. ........................... 345/672; 703/2; 707/100; 707/103 R; 709/223
(58) Field of Search ......................... 703/2, 7; 707/100, 707/103 R, 511, 514; 709/223; 345/672

(56) References Cited

U.S. PATENT DOCUMENTS

| | | | | |
|---|---|---|---|---|
| 4,864,497 A | * | 9/1989 | Lowry et al. ................ 707/102 |
| 4,970,666 A | * | 11/1990 | Welsh et al. ................. 345/423 |
| 5,437,027 A | * | 7/1995 | Bannon et al. .......... 707/103 R |
| 5,561,747 A | * | 10/1996 | Crocker et al. .............. 345/419 |
| 5,649,200 A | * | 7/1997 | Leblang et al. .............. 717/122 |
| 5,655,063 A | * | 8/1997 | Crocker ....................... 345/420 |
| 5,708,798 A | * | 1/1998 | Lynch et al. .................... 703/1 |
| 5,708,828 A | * | 1/1998 | Coleman ...................... 715/523 |
| 5,715,454 A | * | 2/1998 | Smith ........................... 707/203 |
| 5,794,030 A | * | 8/1998 | Morsi et al. ............. 707/103 R |
| 5,812,964 A | * | 9/1998 | Finger ............................ 704/7 |
| 5,815,415 A | * | 9/1998 | Bentley et al. ................ 703/4 |
| 5,819,062 A | * | 10/1998 | Srikantappa ................. 345/440 |
| 5,847,956 A | * | 12/1998 | Bronfeld et al. ............. 345/420 |
| 5,911,074 A | * | 6/1999 | Leprince et al. ............. 717/100 |
| 5,970,490 A | * | 10/1999 | Morgenstern ................. 707/10 |
| 5,995,980 A | * | 11/1999 | Olson et al. ................. 707/201 |
| 6,026,401 A | * | 2/2000 | Brealey et al. ................. 707/8 |
| 6,055,243 A | * | 4/2000 | Vincent et al. .............. 370/466 |
| 6,058,397 A | * | 5/2000 | Barrus et al. ............. 707/104.1 |
| 6,324,576 B1 | * | 11/2001 | Newcombe et al. ......... 707/203 |
| 6,505,204 B1 | * | 1/2003 | Fanjoy ......................... 707/100 |

FOREIGN PATENT DOCUMENTS

EP   WO9736250   2/1997

OTHER PUBLICATIONS

Bak, David. "CAD/CAM comes to Windows". Design News. Mar. 23, 1998. p. 55.*

Beard, Tom. "Tying It All Together". Modern Machine Shop. Feb. 1998. p. 90.*

(List continued on next page.)

*Primary Examiner*—Jean R. Homere
*Assistant Examiner*—Ayal Sharon
(74) *Attorney, Agent, or Firm*—Moser, Patterson & Sheridan LLP

(57) ABSTRACT

A mechanism for translating objects between applications that use different formats is described. As described, a source object is generated using a source application. The source object is then translated to a target object in a target application. The target application having a format that is not supported by the source application. A first modification, which is not supported by the source application, is then performed to the target object. A second modification is also performed to the source object in the source application. Based on the modifications, the target object in the target application is revised to reflect the second modification to the source object without removing the first modification to the target object.

3 Claims, 14 Drawing Sheets

OTHER PUBLICATIONS

Nodine, M. et al. "Cooperative Transaction Hierarchies: Transaction Support for Design Applications". The VLDB Jornal, vol. 1, Issue 1, Jul. 1992.*

Liu, Lung–Chun et al. "Design Data Management in a CAD Framework Environment" 27th ACM/IEEE Design Automation Conference Proceedings. 1991. pp. 156–161.*

Liu, Lung–Chun et al. "Object Database Support for a Software Project Management Environment" Proceedings of 3rd ACM SIGSOFT/SIGPLAN Software Engineering Symposium on Practtial Software Development Environments. 1988. pp. 85–961.*

Shih, Chia–Hui et al. "A Design–Constraint Model to Capture Design Intent". Proceedings of the 4th ACM Symposium on Solid Modeling and Applications. 1997. pp. 255–264.*

Tucker, Allen B. Jr. ed. The Computer Science and Engineering Handbook. 1997. pp. 998–1009, 1066–1074, 1774, 2430–2432.*

Template Software Inc., Using the SNAP Development Environment: SNAP Version 8.0, Second Edition. Copyright 1998.*

Barequet, Gill et al. "A data front–end for layered manufacturing". Annual Symposium on Computational Geometry: Proceedings of the 13th Annual Symposium on Computational Geometry, 1997. ISBN: 0–89791–878–9.*

Krause, F. L. et al. "Processing of CAD–Data—Conversion, Verification and Repair". ACM Symposium on Solid Modeling and Applications, pp. 248–254. 1997. ISBN: 0–89791–946–7.*

Wohlers, Terry. "STL Viewers and Editors". 1996. http://www.wohlersassociates.com/stl–view.html.*

Wolfe, Stephen. "Fixing Bad CAD Data." Computer Aided Design Report, vol. 17, No. 1, pp. 4–7. 1997. Reproduced online, http://www.dexcenter.com/article–fix–bad–cad–data.html.*

BSD 4.2 Unix Manual Pages for "termcap" and "talk".

* cited by examiner

FIG. 4A

CAD SOURCE FILE 402

| OBJECT GEOMETRY 474 | THICKNESS PROPERTY 476 | COLOR PROPERTY 478 | LAYER PROPERTY 480 | ID PROPERTY 481 | TRANSLATION TOGGLE 482 | ... |
|---|---|---|---|---|---|---|
| Circle | 10 | Red | G1 | 7594 | Insert | ... |
| Triangle | 8 | Blue | G1 | 1628 | Insert | ... |
| ... | ... | ... | ... | ... | ... | ... |

↑ 470   ↑ 472

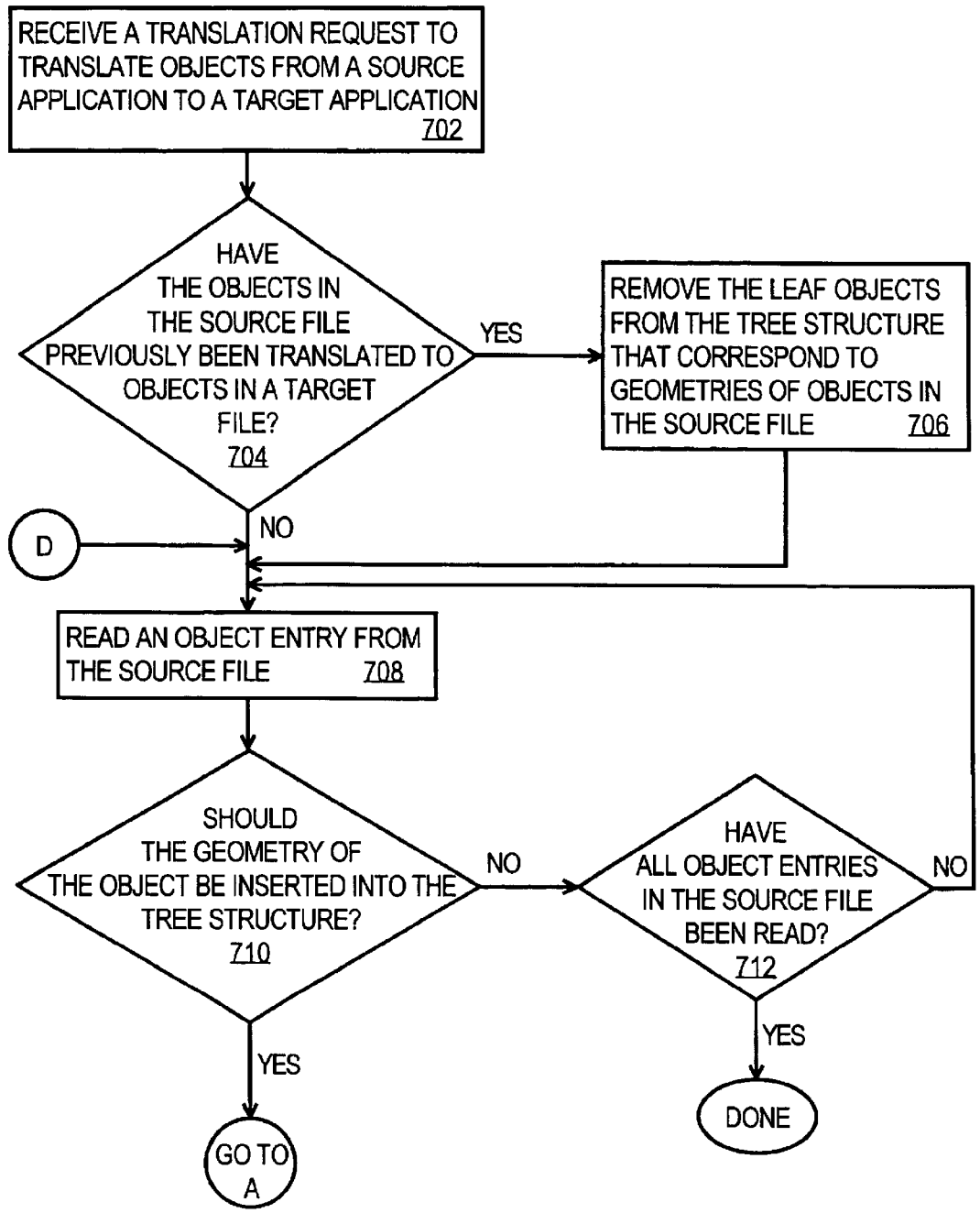

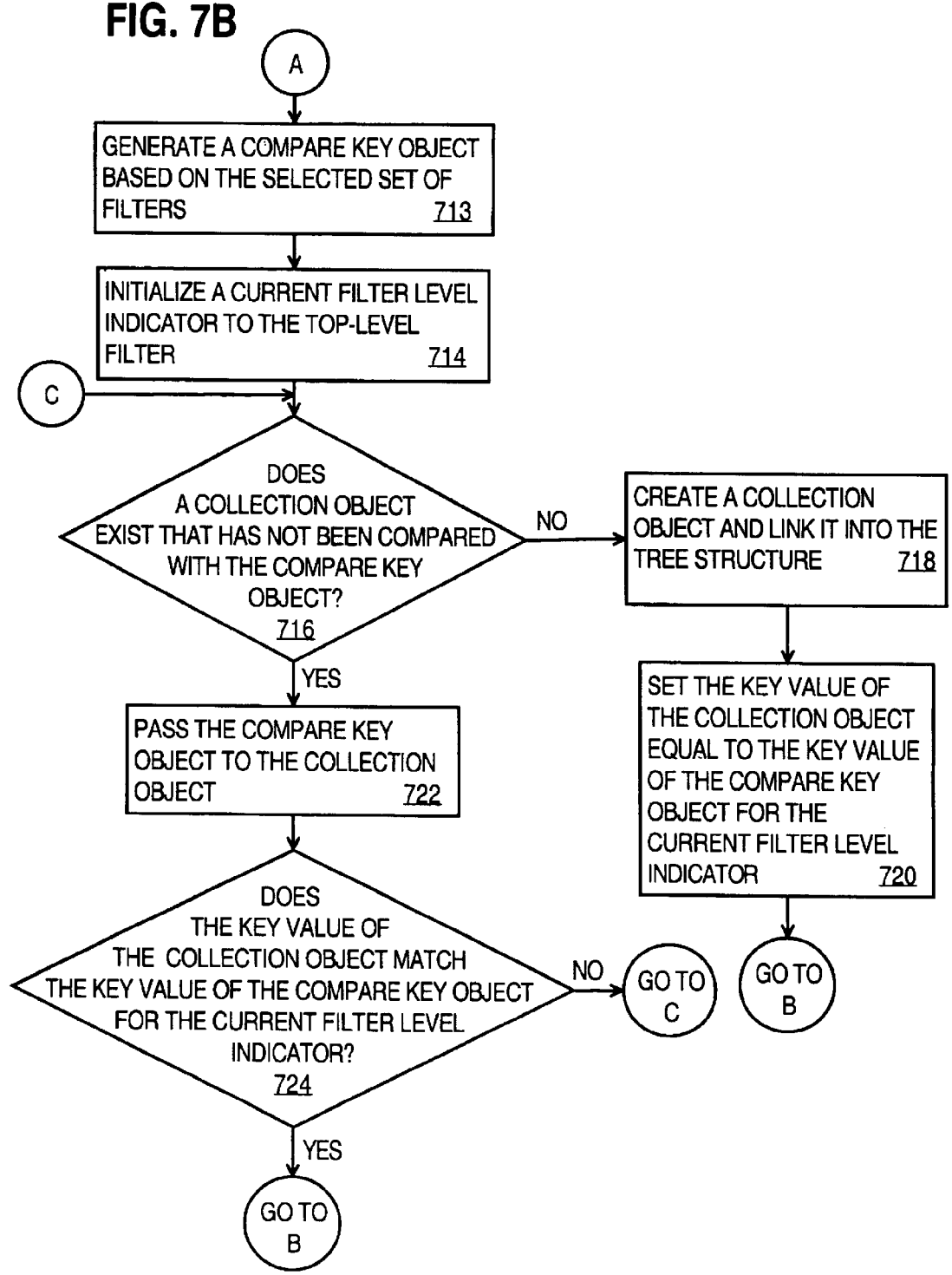

TRANSLATING OBJECTS BETWEEN SOFTWARE APPLICATIONS WHICH EMPLOY DIFFERENT DATA FORMATS

This patent application claims priority from U.S. Provisional Patent Application No. 60/085,436, filed on May 14, 1998, entitled METHOD AND SYSTEM FOR MANIPULATING DIGITAL VISUAL INFORMATION, which is hereby incorporated by reference in its entirety.

FIELD OF THE INVENTION

The present invention relates to computer software and, more specifically, to translating objects between software applications that employ different data formats.

BACKGROUND OF THE INVENTION

In today's market, it is not uncommon to find multiple software applications that perform similar functions but which are based on incompatible data formats. For example, the two software applications, Microsoft Word® and WordPerfect®, are both word-processing programs. They can each be used to create or generate similar documents. However, although the two programs can be used to perform similar functions, they each support, and therefore generate, documents or files using their own particular data format. Thus, the documents or files that are created using the software application Word® contain a data format that is incompatible and not supported by the software application WordPerfect®. Likewise, the documents or files that are created using the software application WordPerfect® contain a data format that is incompatible and not supported the software application Word®.

To resolve the problem of incompatible data formats, many programs include routines or functions that can be used to translate a document or file that was created by a first application ("source application"), into a document or file that has a data format that is supported by a second application ("target application"). For example, the software application Word® includes a set of software translation routines or functions that can translate a document or file that was created by WordPerfect® into a document or file that has a data format that is supported by Word®.

For the purpose of explanation, the data format supported by a source application is referred to herein as the source data format, and the data format supported by a target application is referred to as the target data format. Thus, in the example given above, the source data format is the format used by WordPerfect®, while the target data format is the format used by Word®.

A drawback with translating a document or file from a source data format into a target data format is that the conversion is typically performed as a one-time translation. That is, each translation is made without regard to any changes that may have been made by the target application to a previous converted copy of the file. For example, a source application, which uses a data format "A", may be used to generate data having a data format "A". If the data is to be used by a target application which uses a data format "B", the data must be first translated from data format "A" ("initial data") to a data format "B"("converted data"). Once the data is translated, the target application may be used to change and modify the converted data as needed. However, if the source application is used subsequently to update the initial data, performing a second translation will conventionally cause either the changes made by the target application to be lost or duplicated data to be included in the second conversion. For many applications, converting data without regard to changes that have been made at the target application is unacceptable as those changes that are lost will need to be re-entered.

In the area of computer design software, two different types of programs are generally used to simulate the architecture and physical layout of a particular design. In certain cases, the two different types of programs may include a computer aided design (CAD) application and a visual rendering application. Although both types of computer design applications can be used to design and define both two-dimensional and three-dimensional objects, they are each used to solve a different set of problems for generating a design layout.

CAD applications, such as AutoCAD® R14, which is commercially available from Autodesk Inc., include a popular set of software design tools that can be used to perform the CAD functions. CAD applications are typically used to develop an initial description for the objects that are to be created in a layout. In general, a CAD application will generally use high precision variables, such as double precision floating point variables, in describing a particular object. Thus, the CAD applications provide a more precise description of an object than the visual rendering applications and are generally used to produce working drawings or construction documents of the layout. The construction documents provide a schematic type of view that generally depicts the objects two-dimensionally and is typically used to provide a specification for what needs to be built and how it is to be built.

In generating a construction document, the CAD application uses a particular set of "design" attributes to describe the objects that are to be contained in the layout. The design attributes consist of an object geometry that describes the particular geometry of the object and a set of object properties that when applied enhance or modify the particular object. For example, an object's geometry may consist of a set of lines and vertices that define a rectangular object or a point and radius that define a circular object. Alternatively, the set of object properties may include a thickness property and a color property that respectively cause the object to be displayed as a cylinder that is of the color red. In addition, certain CAD applications also allow objects to be annotated by providing object properties that allow users to associate text with certain objects. The annotation can be used to attach descriptive information to certain objects within the construction document.

Visual rendering applications, such as 3D Studio VIZ™, which is commercially available from Autodesk, Inc., include a popular set of software design tools that can be used to perform visual rendering application functions, such as modeling, rendering and animation. Visual rendering applications allow the user to enhance and extend the output that is generated by the CAD application once the objects are displayed in a rendered scene ("target scene"). Geometry can also be modeled and rendered without CAD objects.

While a CAD application typically uses design attributes, a visual rendering application uses a set of "rendering attributes". The rendering attributes used by a visual rendering application depict objects in a target scene in three-dimensions and can be used to provide a more realistic view of what the finished design will look like. By contrast, the construction document provides a schematic view.

Similar to the design attributes, the rendering attributes consist of an object geometry that describes the particular geometry of the object and a set of object properties that, when applied, enhance or modify the particular object. However, the object properties associated with the visual rendering application provide a different set of enhancements or modifications to the particular object than the type of enhancements that can be done using the object properties provided by CAD applications. For example, the object properties associated with a visual rendering application typically allow objects to be viewed in a target scene as having a particular texture or material, or to visualize how certain lighting would look when applied to a particular object. Some visual rendering applications also allow certain objects to be animated so as to move or change over a period of time. Thus, the visual rendering application uses a particular set of "rendering" attributes that do not directly map to similar design attributes that are used in the CAD application.

In general, to create a design layout, a user interfaces first with a CAD application to generate an initial construction document of a desired layout. The construction document is generated using a particular set of design attributes that describes a particular geometry and set of properties for each object. Once the construction document is generated the visual rendering program is used to add texture, lighting and other design features to the objects that are not supported by the CAD application.

However, because the data format that is used by the CAD application is incompatible and not supported by the visual rendering application, a translation must be performed to convert the CAD application design attributes into corresponding rendering attributes that are supported by the visual rendering application. FIG. 1 illustrates a conventional translation process 100 for translating object geometries from a CAD application 102 ("source application") to a visual rendering application 104 ("target application"). In this example, CAD objects are created and defined using the CAD application 102. The CAD object definitions are created using a data format ("source data format") that is native to the CAD application 102 and are typically stored in one or more CAD files 106 ("source files"). In AutoCAD® R14, the CAD files 106 are generally known as .DWG files. A translation 110 is performed to import the CAD object definitions from the CAD application 102 into a visual rendering application 104 ("target application"). In performing the translation 110, the CAD object definitions are translated from their source data format to a rendering data format ("target data format") that is native to the visual rendering application 104. The visual rendering application 104 typically maintains the rendering object definitions in one or more rendering files 108 ("target files"). In 3D Studio VIZ™, the rendering files 108 are generally known as .MAX files.

One drawback with translating the CAD design attributes into a set of rendering attributes is that CAD attributes that do not map directly into rendering attributes are lost. Another common problem with translating the CAD design attributes into a set of rendering attributes is that once the conversion is performed any dependencies between the objects in the CAD application and the visual rendering application are lost. Thus, as is often the case, if updates are made to the design attributes on the CAD application side subsequent to the first translation, either (1) a subsequent translation is required for the design attribute changes to be reflected in the rendering environment; or (2) the design attribute changes must be reapplied manually in the rendering environment which is a duplication of effort.

Unfortunately, between the time of the first translation and the second translation, changes may have been made to the rendering attributes on the visual rendering application side. If such intervening changes have occurred, then performing a second translation to convert the updated CAD design attributes into a corresponding set of rendering attributes will either (1) cause the intervening changes made by the visual rendering application to be lost; or (2) cause unwanted (duplicate) objects to be introduced into the rendering application.

For example, a CAD application may be used to create three objects (A1, A2 and A3). Object A1 has a height of ten ("10"), object A2 has a height of five ("5") and object A3 has a height of two ("2"). In performing a first translation, the three objects (A1, A2 and A3) are converted into three objects (B1, B2 and B3) having corresponding heights of ten ("10"), five ("5") and of two ("2"). Through the use of the visual rendering application, object B1 is modified to have a height of eight ("8") and objects B2 and B3 are modified to have a brick-like texture. If an update is then performed to objects (A1, A2 and A3) using the CAD application such that a second translation is required to be performed, either (1) the changes made by the visual rendering application to objects (B1, B2 and B3) will be overwritten and thus lost by the updates made by the CAD application; or (2) the second conversion will cause the updated objects (A1, A2 and A3) to be converted into an additional set of objects (B4, B5 and B6) thus introducing unwanted duplicates of the objects.

On one hand, in the case where the changes made by the visual rendering application are lost, the user must re-enter and perform all changes that were previously made using the visual rendering application. On the other hand, if duplicate objects are inadvertently introduced into the visual rendering application data by the second translation, the user must identify and remove those objects and/or updates that were incorrectly and unwittingly introduced.

In addition, in the case where a large number of objects are required for a particular layout, or a significant number of changes or updates are made in either the CAD application or the visual rendering application, the drawback associated with translating objects a second time from a first data format to a second data format is significantly increased.

Based on the foregoing, it is highly desirable to provide a mechanism that allows changes or updates made by two different applications having two different data formats to be correctly reflected in a target data format when translated from a source data format.

SUMMARY OF THE INVENTION

The foregoing needs, and other needs and objects that will become apparent from the following description, are achieved in the present invention, which comprises, in one aspect, a method for translating objects between applications that use different formats, comprising the steps of generating a source object in a source application; translating the source object to a target object in a target application having a format that is not supported by the source application; performing a first modification to the target object, wherein the first modification is not supported by the source application; performing a second modification to the source object in the source application; and revising the target object in the target application to reflect the second modification to the source object without removing the first modification to the target object.

According to one feature of this aspect, the step of performing the first modification to the target object includes the step of performing a type of modification that cannot be performed using the source application.

According to another feature of this aspect, the source application is a Computer Aided Design (CAD) application and the target application is a rendering application. As such, the step of generating the source object in the source application includes the step of generating a CAD object in the CAD application. The step of translating the source object to the target object includes the step of translating the CAD object into a rendering object. The step of performing the first modification to the target object includes the step of performing a modification to the rendering object. The step of performing a second modification to the source object includes the step of performing a modification to the CAD object; and the step of revising the target object includes the step of revising the rendering object to reflect the second modification that was made to the CAD object without undoing the first modification to the rendering object.

According to another aspect, a method for translating objects between applications that use different formats, the method comprising the steps of generating a first object in a first application; translating the first object to a second object in a second application, wherein the second object has a format that is not supported by the first application; performing a first modification to the second object in the second application; performing a second modification to the first object in the first application; and performing a third modification to the second object based on data generated in response to the second modification to the first object, wherein the third modification causes the second object to reflect the second modification that was made to the first object without undoing the first modification to the second object.

According to one feature of this aspect, the steps of performing the first modification to the second object includes the step of performing a type of modification that cannot be performed using the first application.

The invention also encompasses a computer-readable medium and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A illustrates an example of properties that may be associated with objects contained in a CAD source file;

FIG. 7A is a flow diagram illustrating a sequence of steps for translating objects from a source application to a target application;

FIG. 7B is a flow diagram that illustrates a further sequence of steps for the flow diagram of FIG. 7A;

DETAILED DESCRIPTION OF THE PREFERRED EMBODIMENT

A method and apparatus for translating objects between software applications that employ different data formats is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
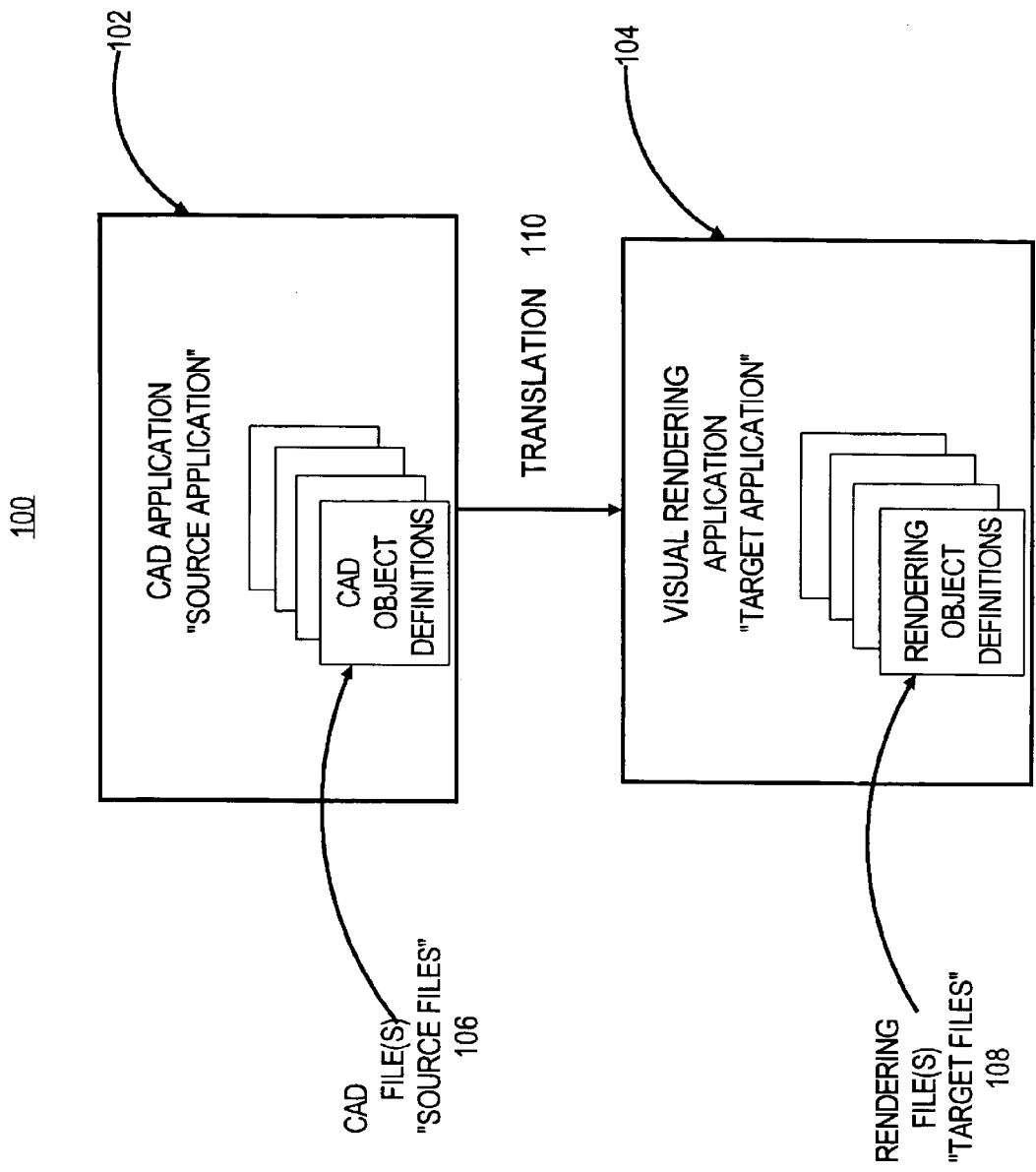
FIG. 1 illustrates a translation process for translating object geometries from a CAD application to a visual rendering application as performed by the prior art.
Figure 2:
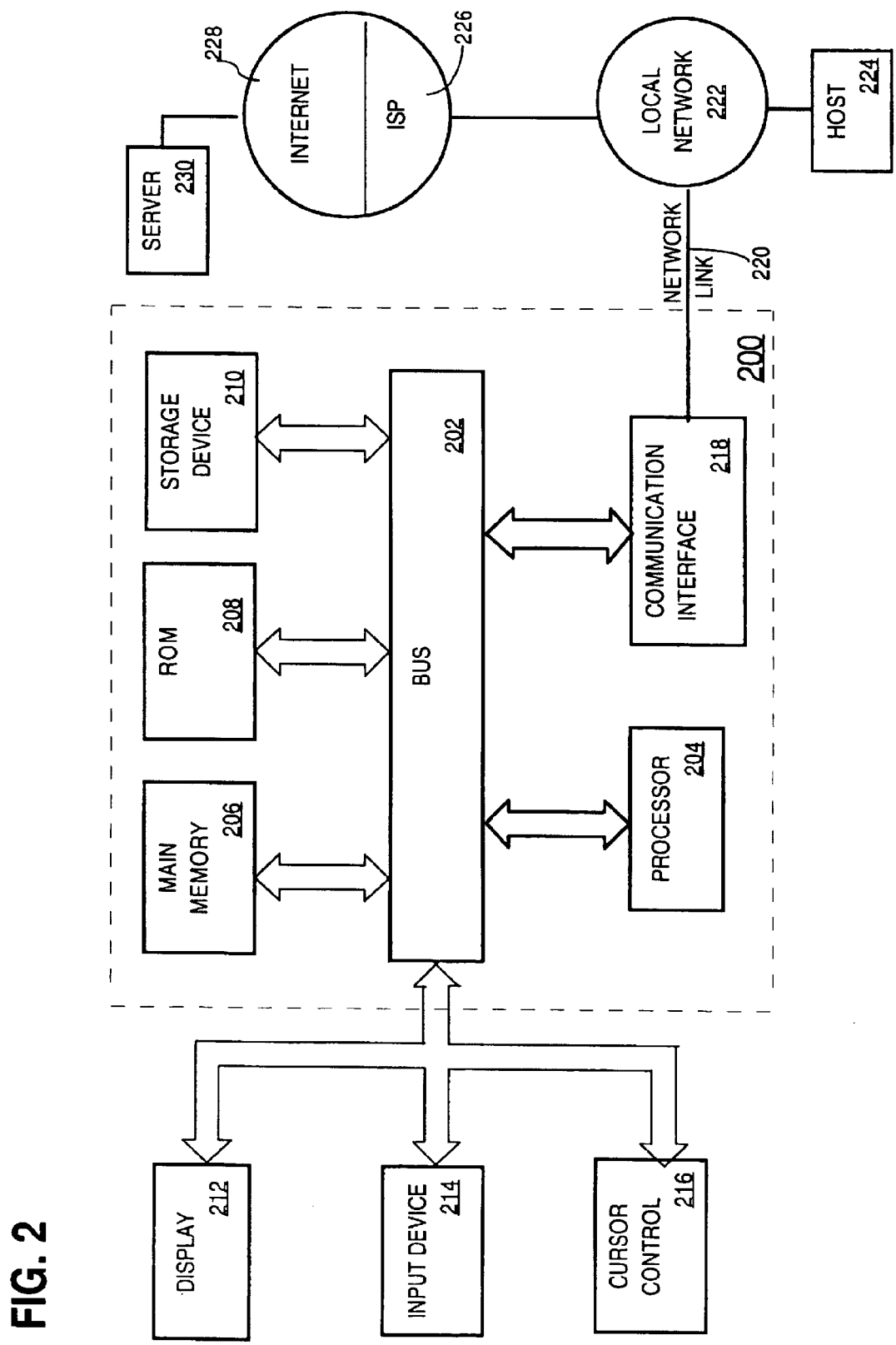
FIG. 2 is a block diagram illustrating a computer system on which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for translating objects between software applications that employ different data formats. According to one embodiment of the invention, the translating of objects is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for translating objects between software applications that employ different data formats as described herein.

The received code may be executed by processor 204 as it is received, and/or stored in storage device 210, or other non-volatile storage for later execution. In this manner, computer system 200 may obtain application code in the form of a carrier wave.

Overview

Figure 3:
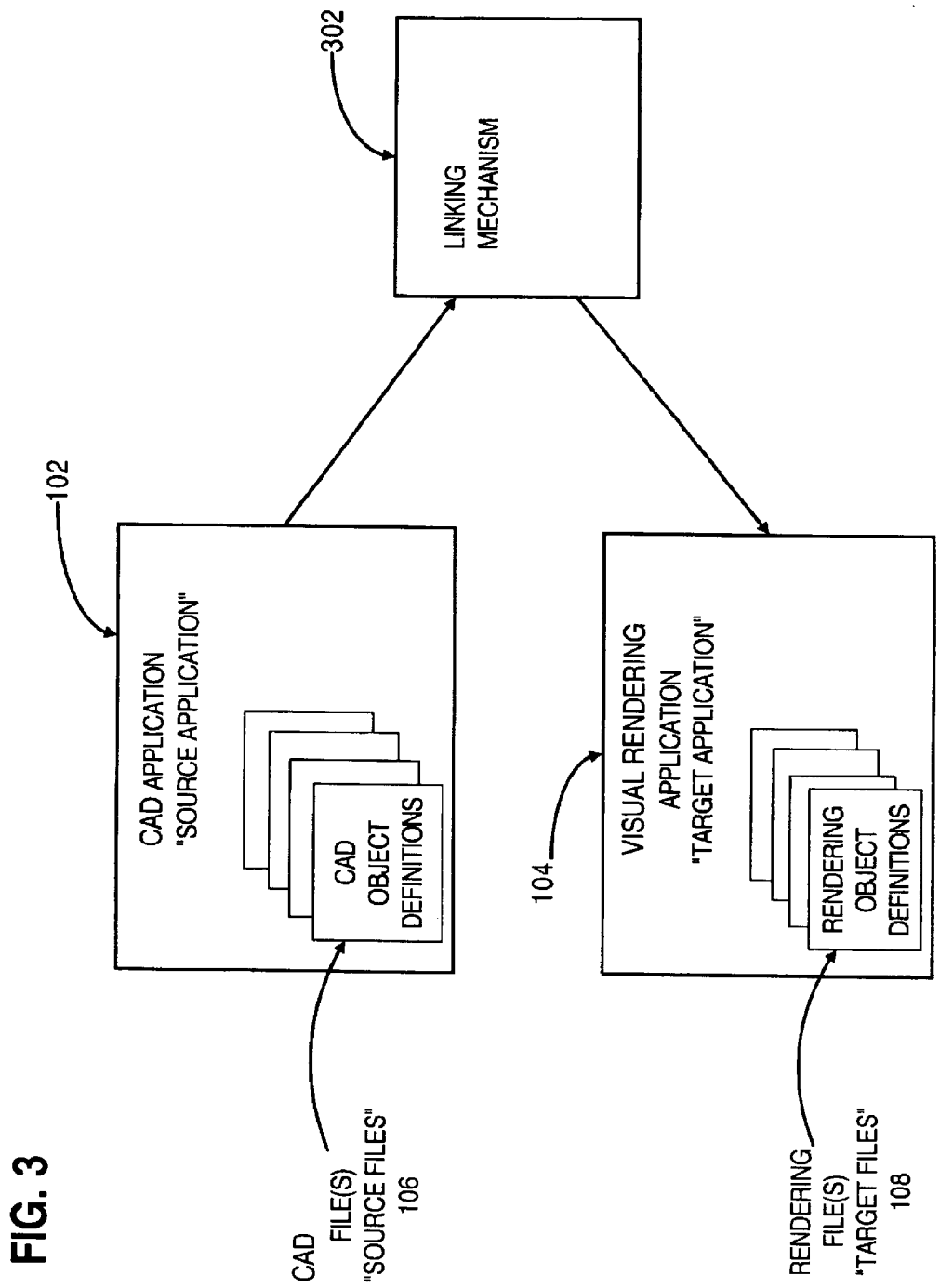
FIG. 3 illustrates a block diagram in which a linking mechanism is used to map the objects in a source application to the objects in the target application.

FIG. 3 illustrates a block diagram in which a linking mechanism 302 is used to map the objects created in a source application 102 to the corresponding objects used in a target application 104. The linking mechanism 302 maintains a system for mapping for each object in the source application 102 to a corresponding object in the target application 104. When an update is performed on an object definition in the source application 102, the mapping system is used to apply the update to an object definition of an object in the target application 104, (1) without removing any wanted intervening changes that were made to the object through the use of the target application 104; and (2) without causing unwanted duplicate object definitions to be introduced in the target application 104.

Mapping Source Objects to Target Objects

Different types of linking mechanisms may be employed for mapping the source objects to corresponding target objects. According to one embodiment of the invention, the mapping of source objects to corresponding target objects is performed through the use of a hierarchical tree structure. The hierarchical tree structure provides a mechanism for organizing the properties that are associated with both objects defined in the source application and objects defined in target application such that updates that are made to objects in the source application will correctly flow into objects defined in the target application.

In one embodiment, properties that are associated with objects defined in the source application are used in constructing the hierarchical tree structure and to map the geometries of objects into leaves within the tree. In addition, properties associated with objects defined in the source application are reproduced at certain locations within the hierarchical tree structure. In one embodiment, the particular level in which an object property is reproduced in the hierarchical tree structure determines whether or not the property is actually applied to the object by the target application.

For explanation purposes, the specifics of how such a hierarchical tree structure can be employed will be explained in the context in which the source application 102 is a CAD application and the target application 104 is a visual rendering application. In this context, linking mechanism 302 maps design attributes of objects created by a CAD application to rendering attributes of objects supported by a visual rendering application.

When implemented in the context of CAD-to-rendering translations, "filter objects" may be used to determine where the geometry of an object is to be inserted into the tree structure. Specifically, the filter objects are used to organize the object geometries that have been translated from the geometries of objects that are contained in the one or more source files 106.

In one embodiment, the hierarchy tree structure is built using one or more filter objects that provide branching logic for storing the object geometries as leaf objects. In certain embodiments, keys, coordinated with filter objects provide equality tests to insert into the hierarchy tree structure the geometries of the objects that have been translated from object geometries in a source file.

In one embodiment, once the hierarchical tree structure is generated, its information is stored into the one or more target files 108. The visual render application then uses the information that is stored in the one or more target files to display the translated objects in a target scene.

Example-Source Object Properties

FIG. 4A illustrates an example of properties that may be associated with objects contained in a CAD source file. In this example, the CAD source file 402 includes, among other things, object entries 470 and 472. Each of the object entries 470 and 472 stores data about an object, where the data is stored in a set of fields. In the illustrated embodiment, the set of fields contained by each object entry includes an object geometry field 474 and a set of object properties fields. The set of object properties fields includes a thickness property field 476, color property field 478, layer property field 480 and an ID property field 481. The object entries 470 and 472 as well as the values contained therein were generated using the CAD application.

The object geometry field 474 of an object entry defines the specific geometry for the object associated with the entry, as defined using the CAD application. For example, the object geometry field 474 of a particular object entry may include a set of vertices and/or faces that describe the geometry of the object associated with the object entry.

The values in the object properties fields of an object entry define a set of properties that are applied to and thus used to enhance or modify the geometry of the object associated with the object entry. In this example, the set of object properties includes values for a thickness property field 476, a color property field 478, a layer property field 480 and an ID property field 481. The value contained in the thickness property field 476 of an object entry defines the thickness or three-dimensional extrusion height of the associated object's geometry. For example, for object entry 470, the thickness property field 476 holds the value ten ("10"), and will cause the geometry of the object associated with object entry 470 to be a circular cylinder (an extruded circle) having a height equal to ten ("10") units.

The color property field 478 stores data that defines the particular color that is to be applied to the object geometry. For example, for object entry 470, the color property field 478 stores the value "red", which will cause the object geometry to be red. The layer property defines the particular layer for which the object associated with object entry will be located in the target drawing. The object ID property field 481 stores a unique identification number that is associated with objects that are created using the CAD application. It should be noted that the particular set of properties was chosen for explanation purposes and that the invention is not limited to any specific set of object properties. For example, other object properties may include properties such as line types (e.g., a continuous line, series of dashes or dots), object type (e.g., a circle, chair, or tree), line weight or line thickness (e.g., hairline, medium line or heavy line), and other properties that are common to all of the objects in a source application.

Inserting Geometries of Objects into the Hierarchical Tree Structure

Figure 4B:
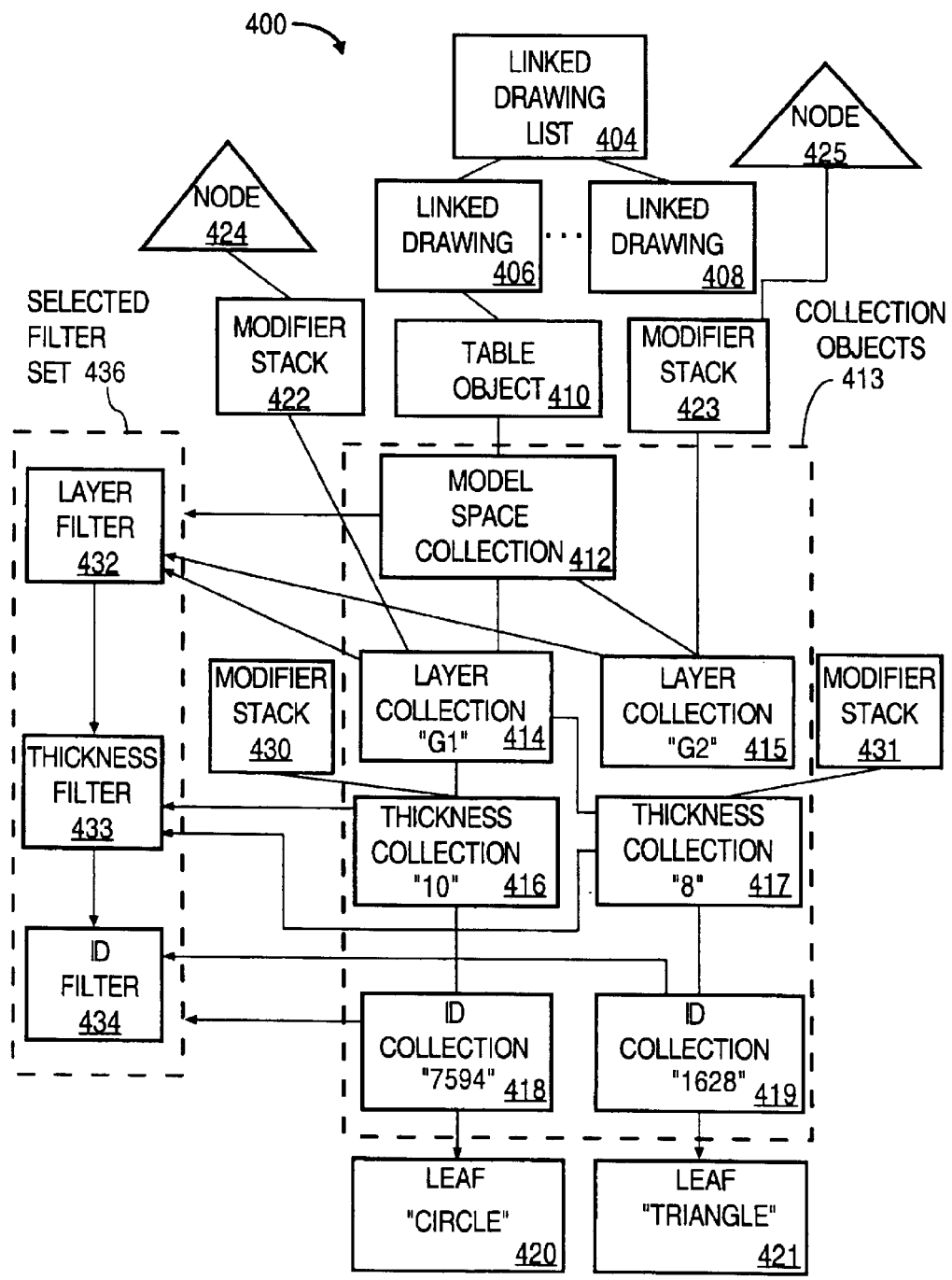
FIG. 4B illustrates an example of a hierarchy tree structure that is built based on attributes of objects that are specified in a CAD source file.

Inserting the geometries of objects into the hierarchical tree structure creates a mapping between the properties associated with the objects in the CAD application and the properties associated with objects in the visual rendering application. The geometries of objects are stored as leaves within the tree structure. FIG. 4B illustrates an example of a hierarchy tree structure that is built based on attributes of objects that are specified in a CAD source file. To insert the geometries of objects into the hierarchy tree structure 400, the CAD source file 402 is first read to identify which objects are to be inserted into the hierarchy tree structure 400. In one embodiment, the object entries include a translation toggle 482(FIG. 4A) that is used to indicate whether a particular object is to be inserted into the hierarchy tree structure 400. If the toggle value in an object entry is set to a particular value (e.g. "insert") then the object's geometry is inserted into the hierarchy tree structure 400. On the other hand, if the toggle value is set to a different value (e.g. "detached") then the object's geometry is not inserted into the hierarchy tree structure 400. In certain embodiments, a particular property or property value can be potentially used to determine the translation toggle value. For example, all objects that have a layer property value of "G2" can be excluded from being entered into the hierarchy tree structure 400.

In certain embodiments, the CAD program includes controls that allow the user to specify the toggle value of an object created in the CAD program. In response to user input received through the controls, the CAD program stores the toggle value in the object entry associated with the object. Thus, a particular user may control whether or not a particular object geometry is to be inserted into the hierarchy tree structure 400.

When an object that is to be inserted into the hierarchy tree structure 400 is identified by the linking mechanism, certain property values in the object entry for the object are used as "keys" for determining where in the hierarchy tree structure 400 to store the geometry of the object. How keys are used in connection with the set of filters to determine the location to store the geometry of an object is described below.

The hierarchy tree structure 400 includes a set of tree objects that are used to manage the links of the tree. In this example, the tree objects include a linked drawing list object 404, one or more linked drawing objects 406 and 408, a table object 410, a model space object 412, a set of collection objects 413 (layer collection objects 414 and 415, thickness collection objects 416 and 417, ID collection objects 418 and 419), leaf objects 420 and 421, modifier stacks 422 and 423 and nodes 424 and 425.

The linked drawing list object 404 maintains a list of all source files that include objects that are linked into the hierarchy tree structure 400. In one embodiment, the linked drawing list object 404 maintains a list of all .DWG files that contain objects that are to be translated from the source application into the target application. In this example, the linked drawing list object 404 includes an entry that identifies CAD source file 402 as a file having objects that are to be translated to a target application.

Linked drawing objects 406 and 408 each maintain information about a particular source file that is identified in linked drawing list object 404. This information includes settings that are used by the linking mechanism to determine how the information in a particular source file is to be interpreted. In one embodiment, linked drawing objects 406 and 408 each maintain or reference the set of filter objects that has been selected for inserting object geometries into the hierarchy tree structure. In this example, linked drawing object 406 includes settings that are used to determine how the information in the CAD source file 402 is to be interpreted.

Linked drawing objects 406 and 408 initiate the process of linking the geometries of the objects that are contained in the source file. Different events may be used to trigger the linked drawing objects 406 and 408 to initiate the linking of object geometries. For example, linked drawing objects 406 and 408 may initiate the linking of objects geometries whenever an update is made to an object in the CAD application, the CAD file is saved, or upon the receipt of a user initiated request.

The linked drawing object 406 is linked to a table object 410. The table object is used to access the model space object 412 as well as the other objects that have been translated from the source file 402 which are not accessed through the model space object. For example, a CAD application may define objects that are translated not into geometry but into specialized objects, such as light objects, camera objects, and grid objects. Since these objects are not organized by their associated CAD object properties, but rather by some other uniqueness determining scheme, they are accessed separately from model space. For example, camera objects may be organized by the particular view that each camera provides (e.g., hallway view, dining room view, backyard view, etc.).

Linked to the table object 410 is a model space object 412. Model space object 412 generates keys based on the filters that have been selected. These keys are used to map the geometries into the hierarchy tree structure 400. Upon receiving a request to link an object's geometry into the hierarchy tree structure 400, the model space object 412 determines whether a collection object should be generated, or whether an existing collection object is available, for mapping the object's geometry into the hierarchy tree structure 400. Each collection object is based on a particular filter object and is used to coordinate where a particular object geometry is to be inserted into the tree structure. As illustrated in FIG. 4, a collection object either links to one or more collection objects or to a single leaf object which contains the geometry of a particular object.

In certain embodiments, the model space object 412 determines whether a collection object should be generated based on a set of selected filter objects. The set of selected filter objects represent those filter objects that have been selected, either automatically or by a user, for mapping the geometries of objects into the hierarchy tree structure 400. In this example, the set of selected filter objects includes a layer filter object, a thickness filter object, and an ID filter object. Examples of other filter objects are described in further detail below.

In this example, the model space object 412 is linked to a set of collection objects 413. As previously stated, the set of collection objects 413 are used for mapping the geometries of objects into a particular leaf object within the hierarchy tree structure 400. The set of collection objects 413 reference the set of selected filter objects to identify information that is used for comparing and inserting CAD objects into the hierarchy tree structure 400.

In this example, the layer collection objects 414 and 415 represent a top level of collection objects. The layer collection objects 414 and 415 are each associated with a particular key object that is used to determine the particular branch that is taken for mapping an object's geometry into a leaf of the hierarchy tree structure 400. For example, layer filter object 414 is associated with a key value of "G1" while layer collection object 415 is associated with a key value of "G2". Thus, because the object entries 470 and 472 are both associated with a layer property field 480 that is equal to "G1", the geometries of the objects for object entries 470 and 472 will both be mapped through layer collection object 414.

The thickness collection objects 416 and 417 represent a second filter level that is used to determine the particular branch that will be taken to map a particular object's geometry into a leaf object within the hierarchy tree structure 400. In this example, the thickness collection object 416 is associated with a key value of "10" and the thickness collection object 417 is associated with a key value of "8". Therefore, the thickness filter object 416 is used to map object geometries having a thickness property of "10" while thickness filter object 417 is used to map object geometries having a thickness property of "8". Thus, because object entry 470 is associated with a thickness property field 476 that is equal to "10", the object geometry for object entries 470 will be mapped to a leaf that is off of thickness collection object 416. Alternatively, because object entry 472 is associated with a thickness property field 476 that is equal to "8", the object geometry for object entries 472 will be mapped to a leaf that is off of thickness collection object 417.

The ID collection objects 418 and 419 contain unique handles that preserve access to individual object geometries that have been translated from a CAD source file into a rendering target file. In one embodiment, the ID property field 481 which is associated with each object entry, is used as a unique handle by the ID collection objects 418 and 419. By including the ID filter object within the selected filter set, objects having the same object properties can be distinguished from one another as the unique ID causes the generation of a separate leaf object for each object geometry that is translated.

The leaf objects 420 and 421 represent geometry caches that are used to store the geometries of objects once they have been translated from the CAD application format to the visual rendering application format. For example, leaf object 420 is used to store a translated object geometry of source object geometry field 474 of object entry 470 and leaf object 421 is used to store a translated object geometry of source object geometry field 474 of object entry 472.

The modifier stacks 422 and 423 are used to record and maintain some of the modifications that are made to objects through the use of a visual rendering application. In one embodiment, modifiers that are to be applied to objects when they are displayed in a target scene are used to record and maintain the changes made by a visual rendering application. In this example, modifier stacks 422 and 423 represent modifications or updates that have been requested by a user and which are to be applied to certain objects when displayed in a target scene. Examples of modifiers that may be applied to objects by the visual rendering application include bend modifiers, extrude modifiers, modifiers that assign texture coordinates for materials, modifiers that deform an object's geometry, all of which may change or influence the way in which the object's geometry is displayed in the visual rendering application.

Although the modifier stacks 422 and 423 are depicted as being linked to layer collection objects 414 and 415, modifier stacks may be linked to other types of collection objects. For example, an extrude modifier having a value of "S" may be linked between thickness collection object 416 and layer collection object 414 which will force the thickness property of the object whose geometry is stored in leaf object 420 to have a height of "5" and not "10" when displayed in a target scene.

The node objects 424 and 425 include rendering information that is used for displaying the objects that are associated with the leaf objects in the hierarchy tree structure 400 in a target scene. For example, the object nodes 424 and 425 may include such rendering information as the particular material that is to be applied to the objects and the specific location of where the objects are to be placed in the target scene. When a user causes the target application to alter or modify an object in the target scene (for example, move the object to a new location), the rendering information is updated to reflect the changes.

By attaching the node object to the highest level collection object, the number of objects that a user perceives in the target scene can be reduced. That is, a greater number of object geometries will be grouped as a single object when displayed in the target scene by the visual rendering application. For example, by attaching the node object 424 and the modifier stack 422 to the layer collection object 414, the object geometries that map into leaf objects 420 and 421 will be grouped as a single object when displayed in the target scene by the visual rendering application.

However, embodiments of the invention are not limited to having the node objects attached to any particular collection object level. For example, a node object may be alternatively attached to each of the thickness collection objects 416 and 417. In this case, the object geometries that map into leaf objects 420 and 421 will be displayed in the target scene as separate objects by the visual rendering application. Thus, in certain embodiments node objects are not required.

Displaying Objects in a Target Scene

To render an object in a target scene, the object geometries that were translated and stored within each leaf object in the hierarchy tree structure are passed back up the tree to a corresponding node object. As the object geometries are passed up the branches of the hierarchy tree structure, the modification that is stored in each of the modifier stacks is used to modify the geometries of the objects. For example, assuming that leaf object 421 corresponds to entry 470 in CAD source file 402, to render the object geometry (circle) contained in leaf object 421, the geometry is passed up through the ID collection object 419 to the thickness collection object 417. An extrude modifier contained in modifier stack 431, is then applied to the circle causing the geometry to change to a cylinder. The geometry is then passed up to the layer collection object 414. Thereafter, the geometry is passed up to the modifier stack 422 where modifications that have been defined for the geometry in the visual rendering application are then applied.

In one embodiment, extrude modifier values are initialized when the object geometry is inserted into the hierarchy tree structure. For example, if leaf object 421 corresponds to entry 470, when inserting leaf object 421 into hierarchy tree structure 400, an extrude modifier having a value of "10" is included in modifier stack 431. By including an extrude modifier having a value of "10" within modifier stack 431, the geometry contained in leaf object 421 will be rendered having a thickness property of "10".

Upon reaching a particular node object, the object geometries with corresponding modifications are displayed or rendered in the target scene. In certain embodiments, all object geometries that are contained in leaf objects that descend from the same node object, are rendered as a single object from a user's perspective.

For example, to display the object of leaf object 420, the object geometry associated with leaf object 420 is passed up through ID collection object 418, thickness collection object 416, layer collection object 414 and modifier stack 422 before reaching node object 424. Alternatively, to display the object of leaf object 421, the object geometry associated with leaf object 421 is passed up through ID collection object 419, thickness collection object 417, layer collection object 415 and modifier stack 422 before reaching node object 424. Therefore, upon reaching node object 424, the object geometry associated with leaf object 420 will have obtained a thickness property of "10" and any other changes that were stored for the object geometry in modifier stack 422.

On the other hand, upon reaching node object 424, the object geometry associated with leaf object 421 will have obtained a thickness property of "8" and any other changes that were stored for the object geometry in modifier stack 422. Upon reaching node 424, the object geometries and their corresponding object properties are displayed as a single object within the target scene.

Using Keys to Populate the Hiearchy Tree Structure

In one embodiment, to insert an object's geometry into the hierarchy tree structure, the values of certain object properties that are contained in the object's entry in the CAD source file 402 are used as keys for determining whether a particular tree object already exists. If based on the value of the key it is determined that the particular tree object does already exist, then control is passed to the particular tree object to continue the process of identifying a leaf object for storing the geometry of the object. Otherwise, if based on the value of the key it is determined that the particular tree object does not already exist, a new tree object is generated based on the key value and inserted into the hierarchy tree structure. Control is then passed to the newly generated tree object to continue the process of identifying a leaf object for storing the geometry of the object.

Figure 5:
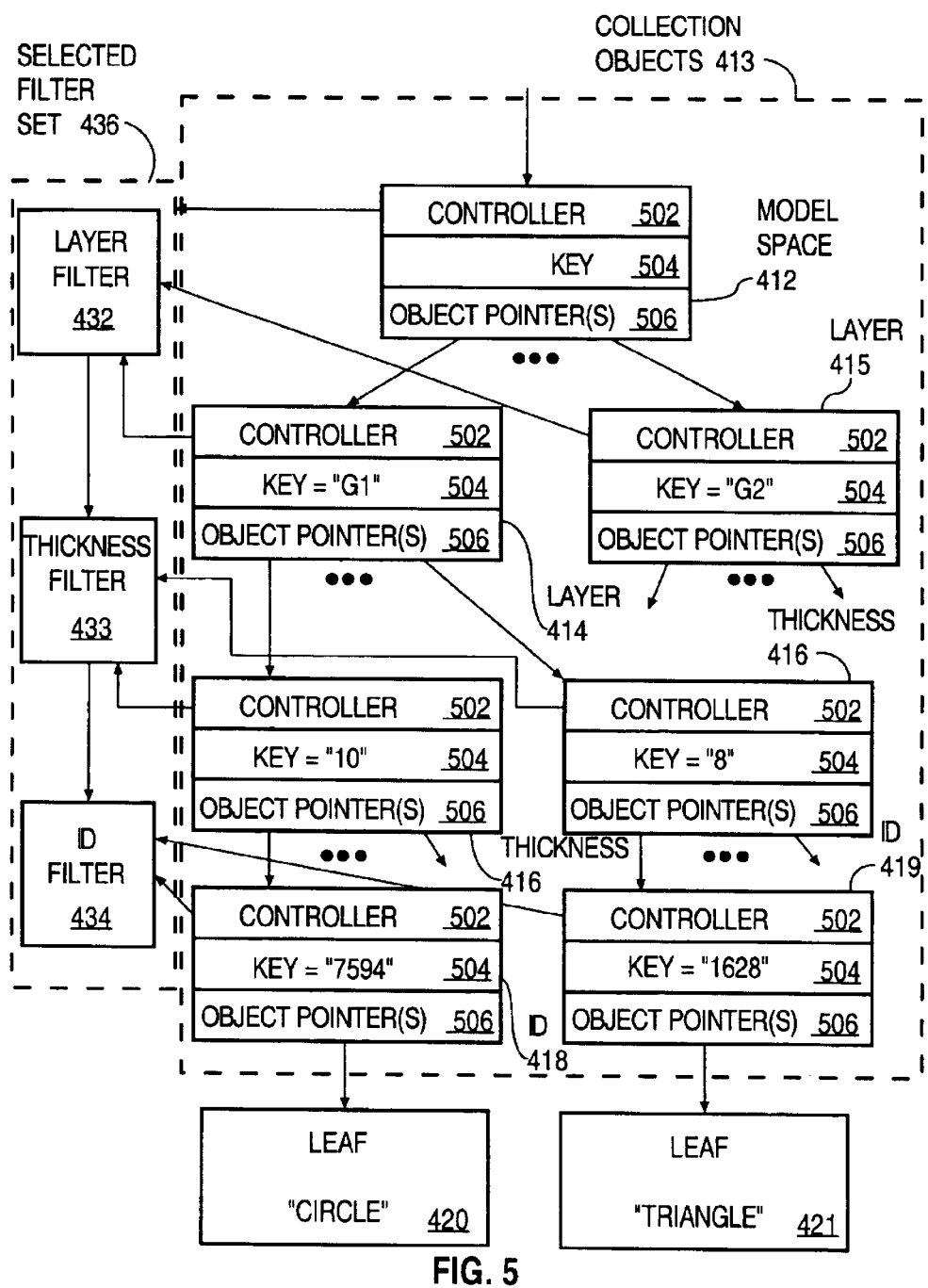
FIG. 5 illustrates certain internal details of several objects depicted in FIG. 4B.

FIG. 5 illustrates certain internal details of the tree objects, model space collection object 412, layer collection objects 414 and 415, thickness collection objects 416 and 417, and ID collection objects 418 and 419. In one embodiment, each collection object includes a controller object 502, a key object 504 and one or more object pointers 506. The controller object 502 is used for managing the locations of the object geometries that are contained in a leaf object below the particular tree object. In one embodiment, the controller object 502 separately maintains (1) location and orientation information for the CAD geometry and (2)

location and orientation information for any changes that have applied in the rendering application. In this way, changes in the CAD application can be detected and applied correctly.

The object pointers 506 link to either a collection object or a leaf object. If a collection object is associated with the lowest selected filter (e.g., the ID filter in FIG. 4), its object pointer 506 will link to a single leaf object. However, if the collection object is a model space object or is associated with a filter other than the lowest selected filter (e.g., the layer or thickness filter), its object pointers 506 will link to one or more collection objects. For example, ID collection object 418 includes a single object pointer 506 that links to leaf object 420. Alternatively, layer collection object 414 includes multiple object pointers 506 that link to thickness collection objects 416 and 417.

The key object 504 holds a particular value that is used to determine whether a collection object currently exists for a particular object geometry or whether a new collection object needs to be created to insert the object geometry into the hierarchy tree structure.

For example, to insert the geometry for entry 470 into the hierarchy tree structure 400, model space collection object 412 interfaces with selected filters 436 to determine that it is to link to a layer collection object. Using the value of layer property 480 for entry 470, model space collection object 412 generates a "compare" key for layer property value "G1". Model space collection object 412 then uses its object pointers 506 to identify, if any, the layer collection objects to which it is linked. For each layer collection object that is identified, the compare key "G1" is compared to the value of the key object 504 that is contained in the layer collection object. If the compare key ("G1") is equal to the value of a key object 504 that is contained in a layer collection object, the model space collection object 412 determines that a new layer collection object does not need to be generated. The model space collection object 412 then passes the object geometry to the layer collection object. Upon receiving the object geometry, the layer collection object performs a similar sequence of steps to determine whether a thickness collection object exists for a thickness property value of "10".

However, if the model space collection object 412 determines that a layer collection object having a key object value of "G1"does not exist, a layer collection object is created and then linked to model space collection object 412. Once the layer collection object is created, its key object 540 value is set equal to the generated key value ("G1"). The model space collection object 412 then passes the object geometry to the newly created layer collection object which then performs a similar sequence of steps to determine whether a thickness collection object exists for a thickness property value of "10".

Through the use of the keys, the hierarchy tree structure can be dynamically populated with collection objects. These collection objects provide branches for inserting leaf objects into the hierarchy tree structure. The leaf objects, in turn, store the geometries of objects.

Examples of Different Sets of Selected Filter Objects

In one embodiment, the set of selected filter objects determine the type of collection objects that are used in generating the hierarchy tree structure. As previously stated, embodiments of the invention are not limited to any particular set of selected filter objects. Filter objects may be generated for any object property that is associated with an object entry in a CAD source file. A particular set of selected filter objects may include one or more filter objects. For example, various types of filter objects may be included in the set of selected filter objects, including but not limited to:

1) a unique object ID filter object;
2) a layer filter object;
3) a thickness filter object;
4) a color filter object;
5) a layer filter object and a thickness filter object;
6) a layer filter object and a color filter object;
7) a layer filter object, a thickness filter object and a color filter object.

It should be noted that this list of sets of selected filter objects is provided only as an example of the types of filter objects that can be used for constructing a hierarchical tree structure. Thus, embodiments of the invention are not limited to any particular set of selected filter objects.

Figure 8:
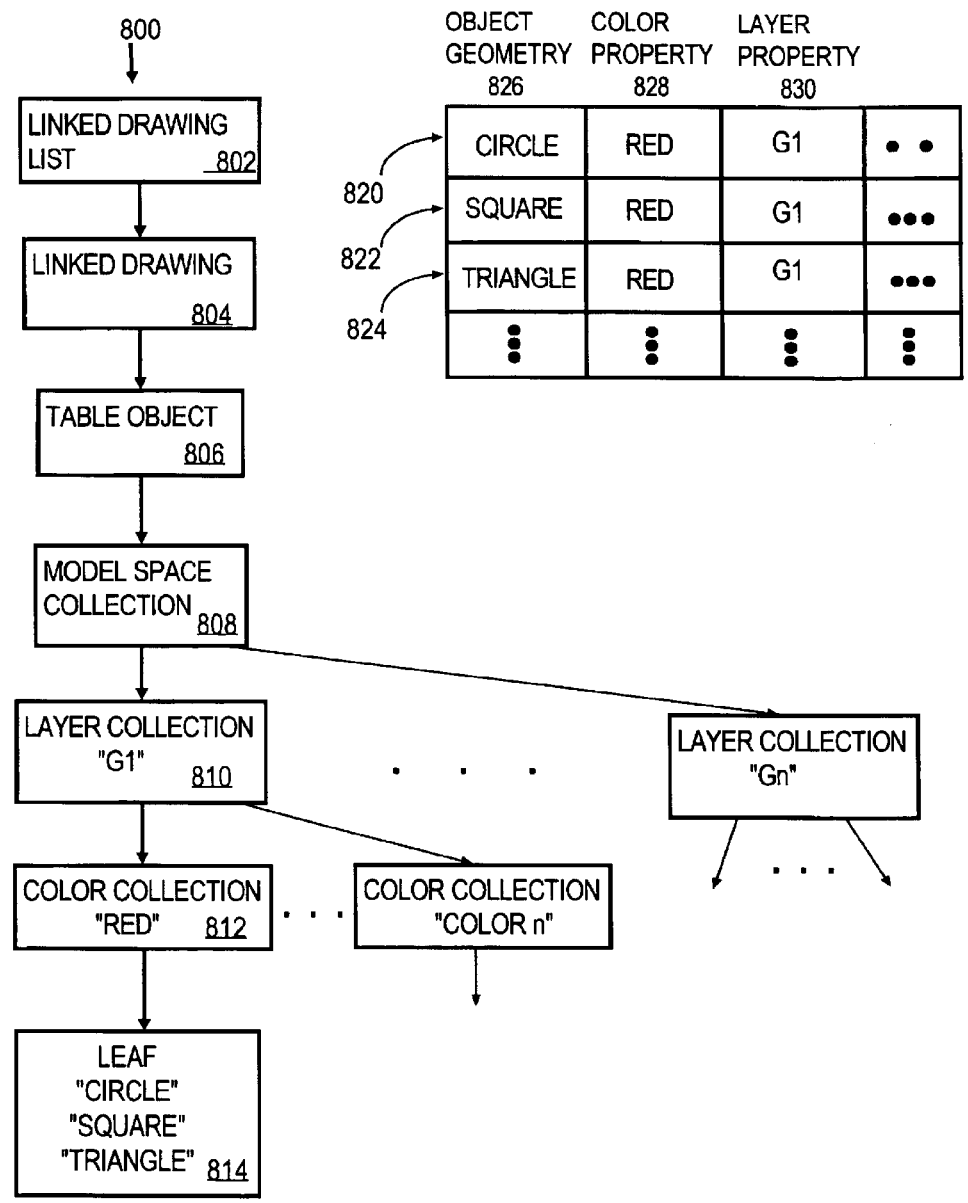
FIG. 8 illustrates a hierarchy tree structure for which leaf objects are linked into the hierarchy tree structure without the use of ID filter objects.

In addition, hierarchy tree structures do not necessarily include ID collection objects. For example, FIG. 8 illustrates a hierarchy tree structure 800 in which ID collection objects are not used for inserting object entries 820, 822 and 824 into tree structure 800. By not including an ID collection object in tree structure 800, the unique ID that is associated with each object in the source application is not used to create a separate leaf object for each object geometry. Thus, by not including ID collection objects in the tree structure 800, multiple object geometries are stored within a single leaf object. In this example, a color collection 812 which has a key value of "RED" links to a single leaf object 814 in hierarchy tree structure 800. Because object entries 820, 822 and 824 are all associated with a layer property 830 that equals "G1" and a color property 828 that equals "RED", when the object geometries of object entries 820, 822 and 824 are translated, they will all be inserted into a single leaf object 814.

User Interface Mechanism

FIG. 6A through FIG. 6D illustrate user interface menus that allow users to interact with the linking mechanism and to control the translation of objects from a source application to a target application. The menus depicted in FIGS. 6A–6D are provided merely as examples of a user interface for manipulating and controlling the translation of objects from a source application to a target application. Thus, embodiments of the invention are not limited to any particular type of user interface mechanism.

Figure 6A:
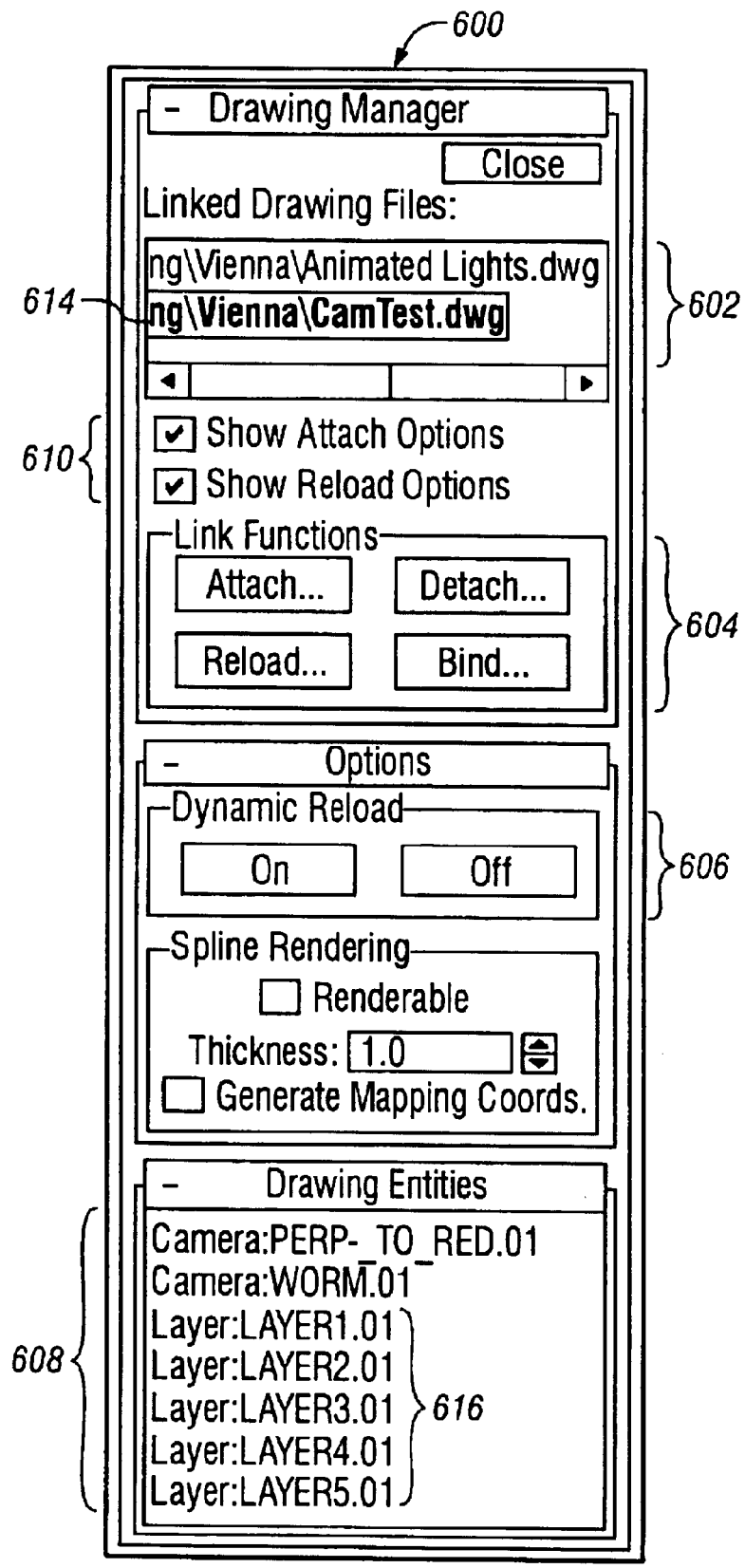
FIG. 6A illustrates an example of a drawing manager dialog that provides a user interface for controlling whether objects in a source file are translated and inserted into a hierarchy tree structure.

FIG. 6A depicts a drawing manager dialog 600 that provides a user interface for controlling whether objects in a source file are translated and inserted into a hierarchy tree structure. In this example, window 602 displays the name of the source files that have been linked to the target application. By selecting a file, as illustrated by "highlighted" file 614, a user may select and update certain options that determine how and when the geometries of objects within the selected file are translated and inserted into the hierarchy tree structure.

Link Function buttons 604 provide a set of user options that can be used to "Attach" a source file, "Detach" a source file, "Reload" the objects of an attached source file or "Bind" the objects into the target file. The Bind option, breaks the link from the target application back to the source application. Essentially, this converts a linked file to an imported file. Subsequent changes to the geometry in the source application will not be reflected in the target application.

Dynamic reload buttons provide an option that lets a user choose whether or not the hierarchy tree is to be automatically updated whenever the objects of a source file are changed. For example, by selecting the "On" button, the hierarchy tree structure may be updated to reflect the changes whenever an attached source file is saved to disk.

Window 608 provides a list of the objects that are contained in "highlighted" file 614. In this example, two camera objects and five geometry objects are included in "highlighted" file 614. In one embodiment, the object name indicates the top-level filter that was used to insert the object into the hierarchy tree structure. For example, geometry object names 616 indicate that a layer filter was used as a top-level hierarchy tree structure.

Selection boxes 610 determine whether certain attach and reload options are displayed to the user. The attach and reload options control whether or not the attach and reload setting dialogs are shown when attach and reload are invoked. This provides a shortcut when the user has previously selected appropriate options or does not wish to change any of these options.

Figure 6B:
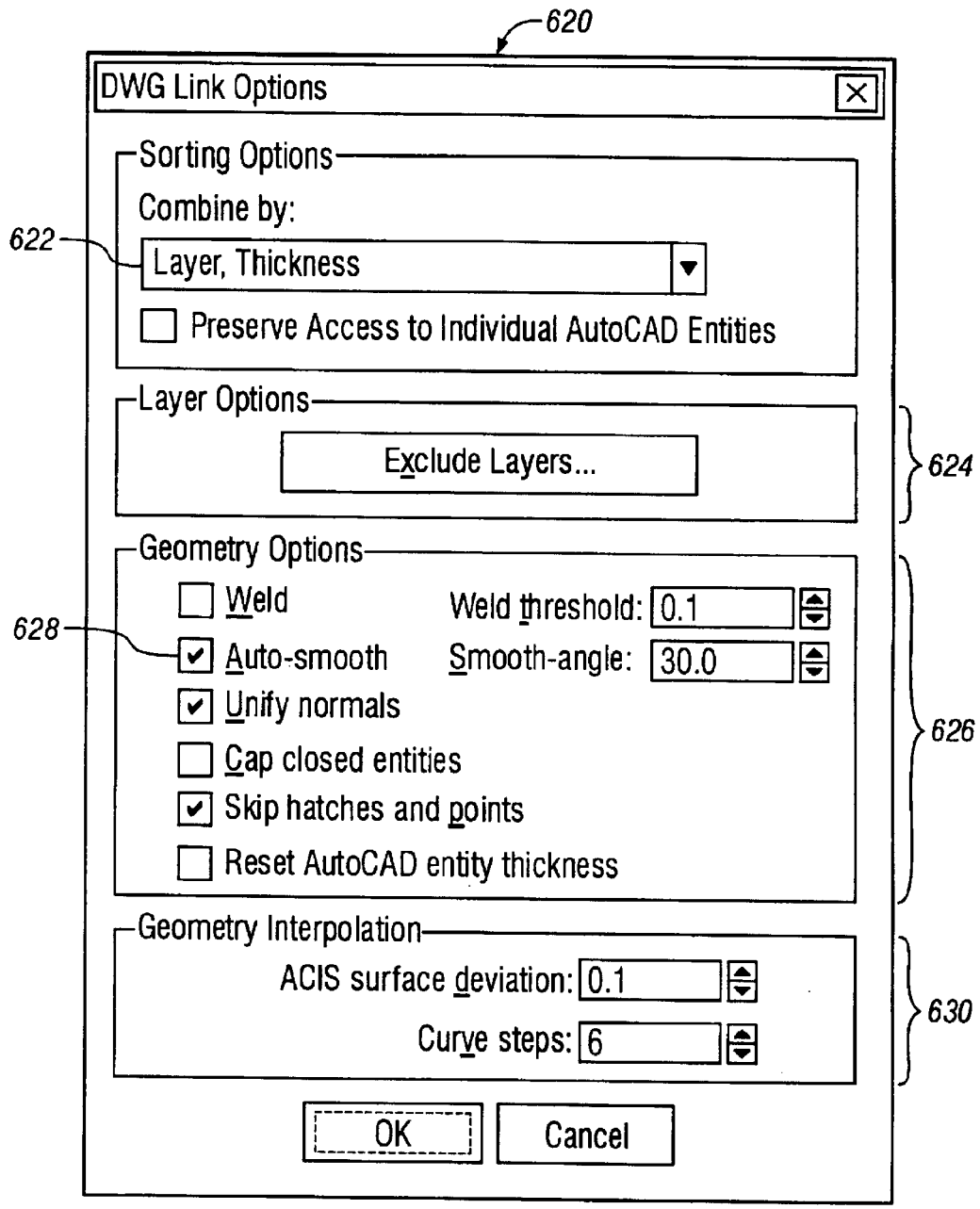
FIG. 6B illustrates an example of an Attach Options dialog that provides a user interface for controlling how object geometries are to be interpreted and/or organized.
Figure 6C:
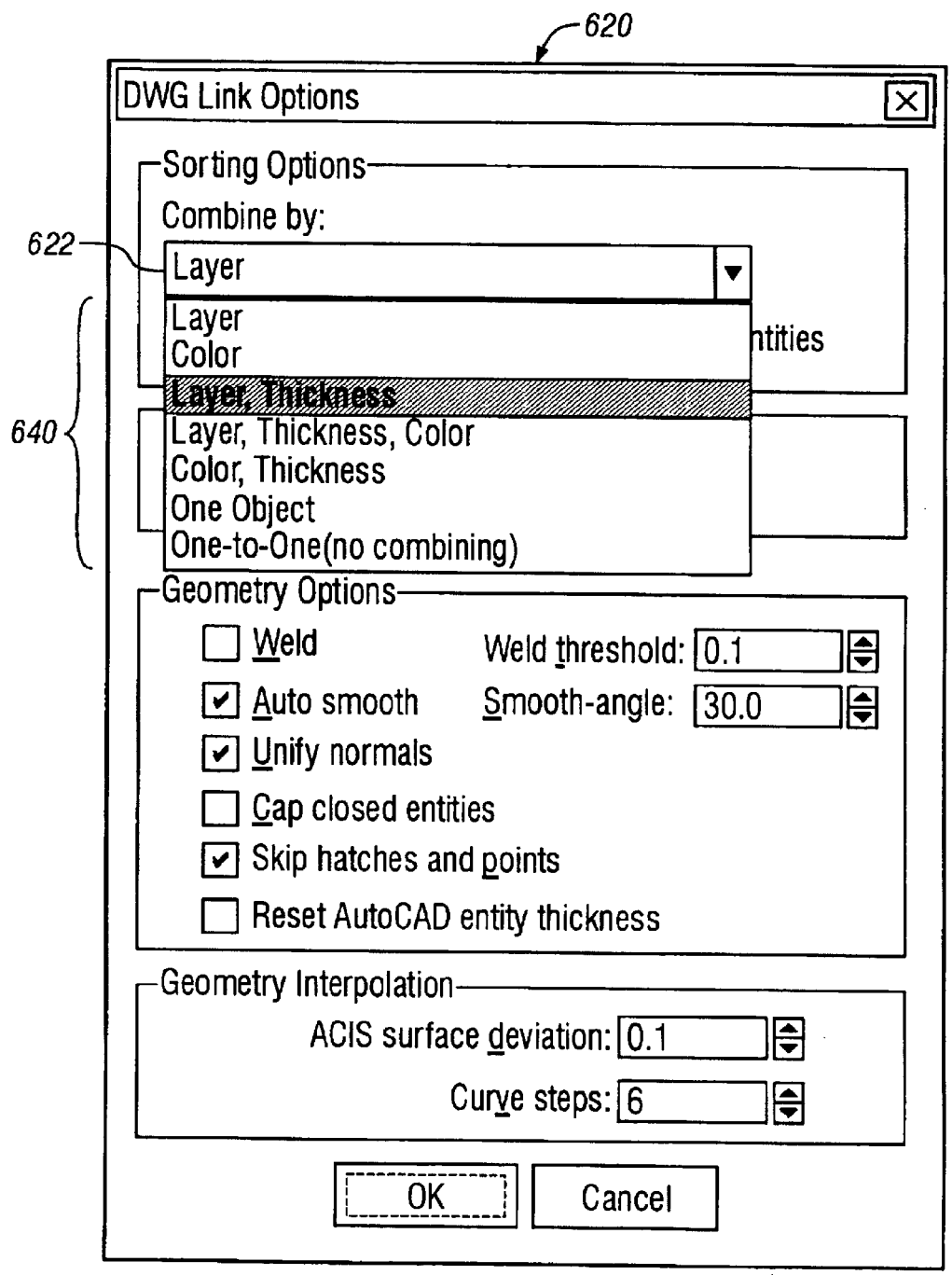
FIG. 6C illustrates an example of a pull-down menu for selecting a set of filter objects for mapping object geometries into a hierarchy tree structure.

FIG. 6B illustrates an Attach Options dialog 620 that provides a user interface for controlling how object geometries are to be interpreted and/or organized. In one embodiment, upon selecting the "Attach" option in user option buttons 604, a user is automatically presented with Attach Options dialog 620. In this example, window 622 displays the particular filter set that has been selected for inserting object geometries into the hierarchy tree structure. In one embodiment, window 622 is associated with a pull-down option that enables users to select a particular group of predefined filter sets for inserting object geometries into the hierarchy tree structure. For example, by selecting the pull-down window option for window 622, a user may be present with filter option groups 640 as depicted in FIG. 6C. Filter option groups 640 represent only an example of some filter object groups that may be provided for the user. Thus, embodiments of the invention are not limited to any particular set of filter objects. In certain embodiments, a user may interactively enter a particular set of filters that are to be used for inserting object geometries into the hierarchy tree structure.

Layer options 624 provide a mechanism in which a user can select one or more layers for which the geometries of objects will not be displayed (rendered) by the target application. This option allows the user to control which layers object geometries are to be displayed. For example, a user may choose not to display the geometry of objects that are associated with layers "G2" and "G4". In one embodiment, the geometries of objects that are associated with "excluded" layers are not translated and inserted into the hierarchy tree structure.

Geometry options 626 allow the user to control how the object geometries are translated. For example, by selecting Auto-smooth box 628, the lines and edges that make-up the object's geometry are automatically smoothed to create a more uniform or realistic look view. As illustrated by Geometry options 626, in certain embodiments, the controls or options that are relevant for a particular dialog are enabled (highlighted) while those controls or options that are not relevant for the particular dialog are disabled (not highlighted).

Geometry Interpolation 630 provide an interface that allows users to choose how the lines that make-up an object's geometry will be interpolated for representing a curved portion of the geometry. For example, with curve steps set to "6", each curve segment of the source entity will be represented by six linear segments in the rendering application. A segment is defined as that portion of a linear or spline geometry that exists between two adjacent vertices.

Figure 6D:
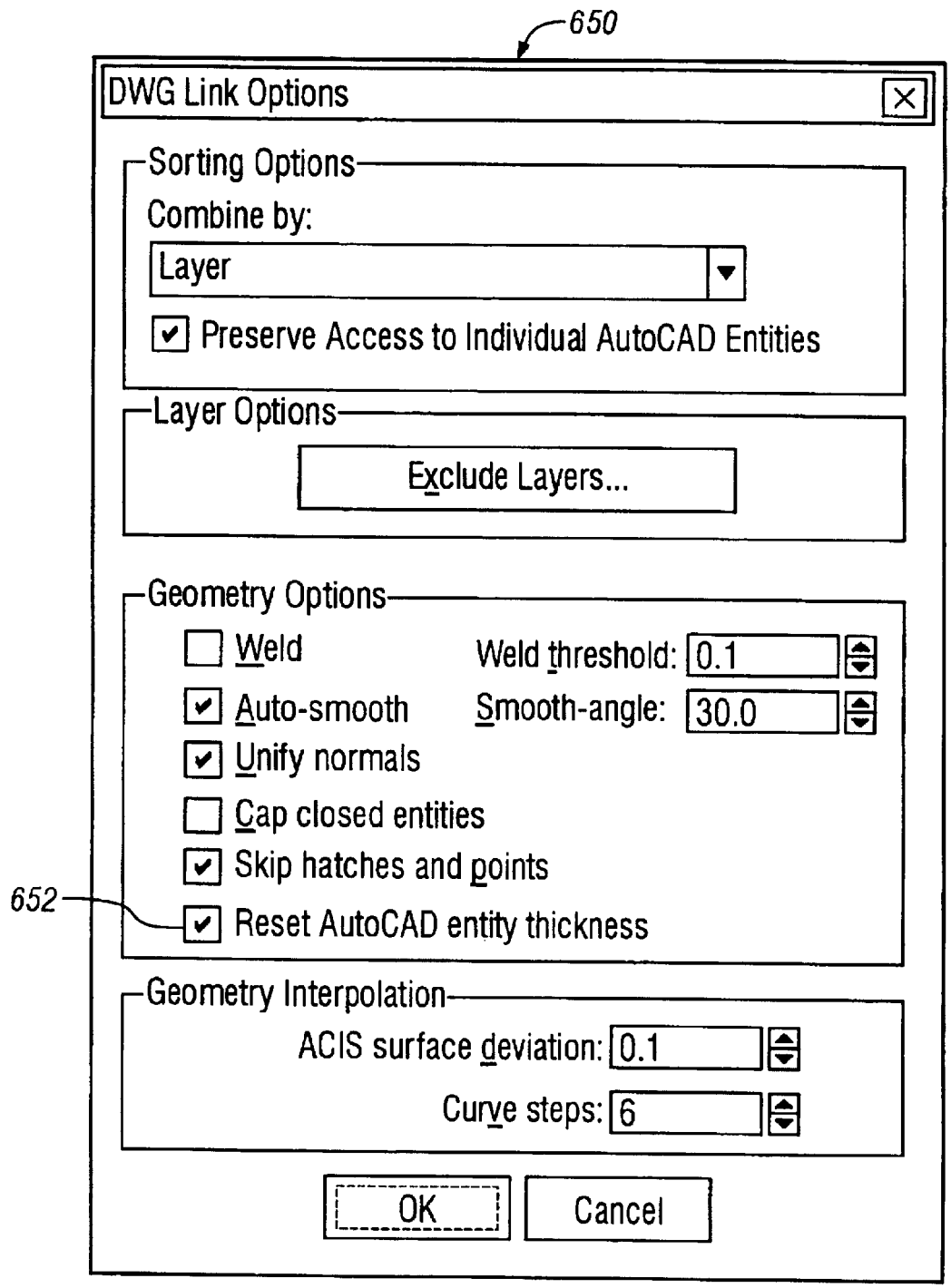
FIG. 6D illustrates an example of a reload options dialog that provides a user interface for controlling how object geometries are to be interpreted and/or organized during a reload operation.

FIG. 6D illustrates a Reload Options dialog 650 that provides a user interface for controlling how object geometries are to be interpreted and/or organized during a reload operation. As depicted, Reload Option dialog 650 provides many of the same options that are offered to the user in Attach Option dialog 620. However, in this example, certain options such as the filter set control options provided in window 622 are disabled to cause the same set of selected filters to be used during the reload of object geometries into the hierarchy tree structure. Other options, such as the "Reset AutoCAD entity thickness" option 652 are enabled in Reload Option dialog 650. The Reset AutoCAD entity thickness option 652 controls whether changes to the thickness property of objects in the rendering application are persistent across reloads, or whether they get reset to the CAD application values. For example, the AutoCAD thickness property is represented in the rendering application as an extrude modifier in the corresponding modifier stack. The user may change the height value of the extrusion in the rendering application. Using the Reset AutoCAD entity thickness option 652, the user can control whether or not the changes to the height value in the rendering application persist across reloads or get reset to the CAD application value.

As with Attach Options dialog 620, the controls or options that are relevant for Reload Options dialog 650 are enabled (highlighted) while those that are not relevant are disabled (not highlighted).

Generating The Hierarchy Tree Structure

Figure 7C:
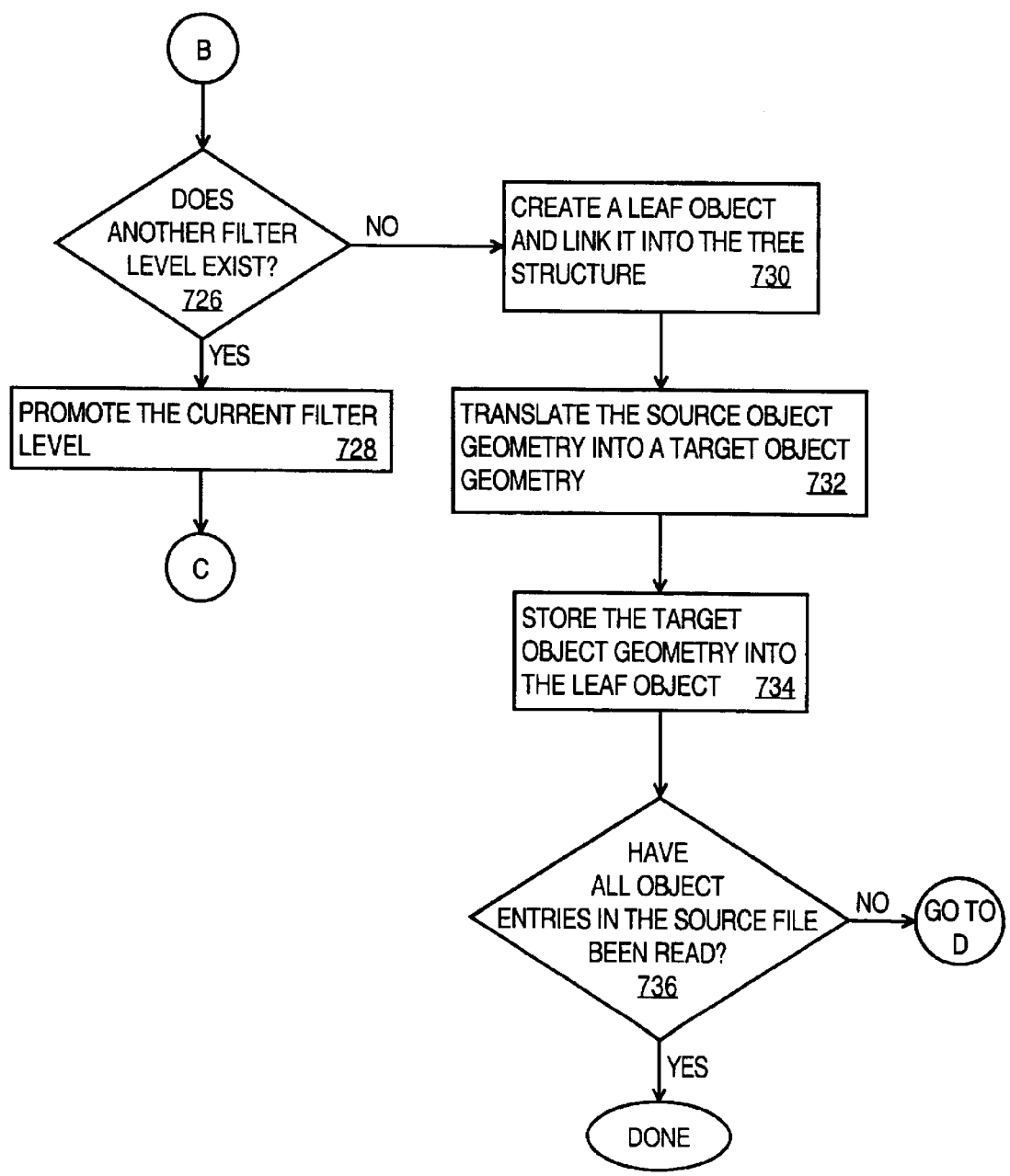
FIG. 7C is a flow diagram that illustrates still a further sequence of steps for the flow diagram of FIG. 7A.

FIG. 7A, FIG. 7B and FIG. 7C collectively form a flow diagram illustrating a sequence of steps for generating a hierarchy tree structure for translating objects from a source application to a target application. For explanation purposes, the steps in FIG. 7A, FIG. 7B and FIG. 7C will be described with reference to FIG. 4A, FIG. 4B and FIG. 5.

At block 702, the linking mechanism receives a translation request to translate the objects in a source application into objects in a target application. For example, a translation request may be automatically received by linked drawing object 426 upon the saving of CAD source file 402. Alternatively, linked drawing object 426 may receive a translation request in response to a user selecting the "Attach" or "Reload" button in Link Function buttons 604 as depicted in FIG. 6A.

At block 704, the linking mechanism determines whether the objects for the particular source file have previously been translated and inserted into the hierarchy tree structure. If at block 704, the linking mechanism determines that the objects for the particular source file have previously been translated, at block 706, the leaf objects are removed from the tree structure. By removing the leaf objects, the previously translated object geometries are removed from the hierarchy tree structure.

At block 708, an object is read from the source file. For explanation purposes, it shall be assumed that the object for entry 470 is read.

At block 710, it is determined whether or not the object's geometry should be inserted into the hierarchy tree structure. As previously indicated, in certain embodiments, a translation toggle 482 is associated each object entry. The translation toggle 482 indicates whether the geometry of a particular object is to be translated and inserted into the hierarchy tree structure. For example, layer options 624 depicted in FIG. 6B provides a mechanism in which a user can select one or more layers for which the geometries of objects will not be displayed (rendered) by the target application. In one embodiment, if a particular layer is excluded, the translation toggle 482 is marked as "Don't Insert" for all entries that contain a layer property 481 that equals the excluded layer. If at block 710 it is determined that the object's geometry should be inserted into the hierarchy tree structure then controls proceeds to block 712.

Alternatively, if at block 710 it is determined that the object's geometry should not be inserted into the hierarchy tree structure then at block 712, it is determined whether all object entries have been read from the source file. If all of the entries have been read, then insertion of object geometries for the particular source file is complete. Conversely, if all of the entries have not been read, then control returns to block 708 to read the next object entry.

At block 712, a compare key is generated for linking the object's geometry into the hierarchy tree structure. In one embodiment, the compare key is generated based on the selected set of filter objects. For example, referring to FIG. 4B, a compare key for entry 470 may be generated by model space collection 412 based on selected filter set 436 that includes at least the following information:

LAYER="G1"

THICKNESS="10"

ID="7594"

At block 713, a compare key is generated for linking the object's geometry into the hierarchy tree structure. In one embodiment, the compare key is generated based on the selected set of filter objects. For example, referring to FIG. 4B, a compare key for entry 470 may be generated by model space collection 412 based on selected filter set 436 that includes at least the following information:

LAYER="G1"

THICKNESS="10"

ID="7594"

At block 716, it is determined whether a collection object exists that is both connected to the current collection object and which its key has not yet been compared with the compare key. For example, model space collection 412 determines whether it is connected to another collection object for which its key has not yet been compared with the compare key. If at block 716 a collection object is identified for which its key has not yet been compared with the compare key, control proceeds to block 722 to compare the keys.

Alternatively, if at block 716 it is determined that a collection object does not exist for which its key has not yet been compared with the compare key, at block 718, a collection object is created and linked into the hierarchy tree structure. For example, assuming that no object entry has been read for a layer of "G1", layer collection object 414 is generated and connected to model space collection object 412.

At block 720, the key value of the generated collection object is set equal to value of the compare key for the current filter level. For example, the key value of layer collection object 414 is set equal to "G1". In addition, a modifier stack may be created for storing the modification that is to be applied to the object's geometry. For example, in setting the key value of thickness collection 416 to "10", modifier stack 430 is generated for storing a thickness or extrusion property of "10". As previously indicated, the modifier stacks are applied to and thus modify the object's geometry during the rendering process. Control then proceeds to block 726.

At block 722, the compare key is passed to the identified collection object. For example, if a reload is being performed on the object for entry 470, or if the object for entry 472 was inserted prior to the object for 470, layer collection object 414 would already exist in the hierarchy tree structure. Thus, the compare key is passed to layer collection object 414.

At block 724, the identified collection object compares its key value with the value of the compare key for the current filter level to determine if they are equal. For example, assuming that layer collection object 414 already exists, the value of the compare key for the current filter level ("G1") is compared to key value of layer collection object 414. If at block 724 the identified collection object determines that its key value does not equal the value of the compare key for the current filter level, control returns to block 716 to determine whether another collection object exists that is both connected to the current collection object and which its key has not yet been compared with the compare key.

However, if at block 724 the identified collection object determines that its key value does equal the value of the compare key for the current filter level, control proceeds to block 726.

At block 726, it is determined whether a next filter level exists. For example, if the current filter level is "layer", the next filter level is "thickness". However, if the current filter level is "ID", a next filter level does not exist. If at block 726 it is determined that a next filter level does not exist, then control proceeds to block 730.

However, if at block 726 it is determined that a next filter level does exist, then at block 728, the current filter level is promoted to the next filter level. For example, assuming the current filter level is filter level "layer", promoting the filter level causes the current filter level to equal the filter level "thickness". Control then proceeds to block 716.

At block 730, a new leaf is created for storing the object's geometry. In this example, leaf 420 is created for inserting the geometry of the object for entry 470.

At block 732, the object's geometry is translated from the source application format to the target application format.

At block 734, the translated geometry is inserted into the hierarchy tree structure by storing it in the newly created leaf.

At block 736, it is determined whether or not all entries for object in the source file have been read. If all entries have been read, the insertion process is complete. However, if at block 736 it is determined that all entries for object in the source file have not been read, control returns to block 708 to read the next entry in the source file.

Alternatives and Extentions

The hierarchical filtering system described herein provides a mechanism by which translated objects can be grouped or combined based on common properties to provide a much simpler model for use by a target application. In addition, by mapping an object's geometry into the hierarchical filtering system based on the object's properties a linking mechanism is provided in which an object's geometry can be updated in the CAD application but continue to be mapped to the same object in the visual rendering application. This allows changes that are made to an object on the visual rendering application side to be maintained even after an additional translation is required due to an update being made to the object on the CAD application side.

In describing certain embodiments of the invention, several drawing figures have been used for explanation purposes. However, the invention is not limited to any particular context as shown in drawing figures, and the spirit and scope of the invention include other contexts and applications in which the linking mechanism described herein is available to other mechanisms, methods, programs, and processes. Thus, although specific details have been provided for explanation purposes, the invention should not be construed as being limited to any particular example or step that has been described. For example, although examples have been described in reference to a CAD source application and a visual rendering target application, embodiments of the invention are not limited to any particular type of software application. Thus, embodiments of the invention may be practiced on any two applications in which their data formats differ. For example, embodiments of the invention can be practiced on two word processing applications employing different data formats. Alternatively, embodiments of the invention may be practiced on two different versions of the same word processing application whose data format has changed between the two versions. Still, embodiments of the invention may be practiced on two different types of applications, such as a spread sheet application and a word processing application.

Also, in the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, embodiments of the invention are not limited to any particular set of selected filter objects. Thus, the selected set of filter objects may include one or more filter objects that are based on one or more properties that are associated with source application objects.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for translating objects between applications that use different formats, the method comprising:

generating a hierarchical structure for organizing one or more properties of a source object being translated to a target object, wherein each level of the hierarchical structure is associated with a property of an object and wherein the source object is associated with source application and the target object is associated with the target application;

using one or more filter objects to determine a location, within the hierarchical structure, to map the one or more properties of the source object, wherein each of the one or more filter objects is associated with a respective level of the hierarchical structure and associated with one or more collection objects of a set of collection objects, according to a first sub-method, comprising:

determining, for a property of the one or more properties of the source object, a property value from a respective filter object that is associated with the property;

comparing the property value with a respective collection value associated with each of one or more respective collection objects of the set of collection objects that are associated with the respective filter object; and determining a level within the hierarchical structure to map the one or more properties of the source object, based on the comparing the property value with a respective collection value; and storing the hierarchical structure in a target file, wherein the target file is used by the second application to construct the target object.

2. The method of claim 1, further comprising:

upon modification of a property of the target object in the target application, generating a modifier stack for storing the modification, wherein the property of the target object is associated with a respective property of the source object;

linking the modifier stack with a collection object of a set of collection objects, wherein each collection object of the set of collection objects is associated with a respective level of the hierarchical structure; and applying the modification of the modifier stack to the target file via the linked collection object to construct the target object.

3. The method of claim 2, wherein each of the one or more filter objects is associated with a respective level of the hierarchical structure according to a second sub-method, comprising:

upon modification of a property of the source object in the source application, using a filter object of the one or more filter objects to determine a level within the hierarchical structure to store the modification;

applying the modification of the property of the source object to the target file that includes the stored hierarchical structure, at the determined level within the hierarchical structure; and applying the modification of the modifier stack to the target file to construct the target object.

* * * * *